US012443702B1

(12) United States Patent
Kaplan et al.

(10) Patent No.: US 12,443,702 B1
(45) Date of Patent: Oct. 14, 2025

(54) PROTECTION AGAINST BRANCH TARGET BUFFER POISONING BY A MANAGEMENT LAYER

(71) Applicant: ADVANCED MICRO DEVICES, INC., Santa Clara, CA (US)

(72) Inventors: David Kaplan, Austin, TX (US); Marius Evers, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/597,465

(22) Filed: Mar. 6, 2024

Related U.S. Application Data

(63) Continuation of application No. 18/224,217, filed on Jul. 20, 2023, now abandoned, which is a continuation of application No. 16/454,690, filed on Jun. 27, 2019, now Pat. No. 11,797,665.

(60) Provisional application No. 62/691,361, filed on Jun. 28, 2018.

(51) Int. Cl.
*G06F 9/38* (2018.01)
*G06F 9/455* (2018.01)
*G06F 21/53* (2013.01)
*G06F 21/74* (2013.01)

(52) U.S. Cl.
CPC .......... *G06F 21/53* (2013.01); *G06F 9/45558* (2013.01); *G06F 21/74* (2013.01); *G06F 9/3806* (2013.01); *G06F 2009/45587* (2013.01); *G06F 2221/033* (2013.01)

(58) Field of Classification Search
CPC ...... G06F 21/53; G06F 21/74; G06F 9/45558; G06F 9/3806; G06F 2009/45587; G06F 2221/003
See application file for complete search history.

(56) References Cited

U.S. PATENT DOCUMENTS

| | | | | |
|---|---|---|---|---|
| 4,525,778 A * | 6/1985 | Cane | ........................ | G06F 9/52 |
| | | | | 711/E12.063 |
| 6,622,241 B1 * | 9/2003 | Brockmann | .......... | G06F 9/3806 |
| | | | | 712/240 |
| 7,890,738 B2 * | 2/2011 | Eisen | .................... | G06F 9/5011 |
| | | | | 712/239 |
| 9,507,730 B2 * | 11/2016 | Brandt | ................ | G06F 12/0804 |
| 10,303,620 B2 * | 5/2019 | Brandt | ................ | G06F 12/1027 |
| 10,740,249 B2 * | 8/2020 | Brandt | ................ | G06F 12/1063 |
| 10,902,092 B2 * | 1/2021 | Conti | .................... | G06F 9/3842 |
| 2003/0200402 A1 * | 10/2003 | Willman | ............... | G06F 12/145 |
| | | | | 711/202 |

(Continued)

*Primary Examiner* — Michael R Vaughan
*Assistant Examiner* — Abdullah Almamun

(57) ABSTRACT

A processing system includes a branch prediction structure storing information used to predict the outcome of a branch instruction. The processing system also includes a register storing a first identifier of a first process in response to the processing system changing from a first mode that allows the first process to modify the branch prediction structure to a second mode in which the branch prediction structure is not modifiable. The processing system further includes a processor core that selectively flushes the branch prediction structure based on a comparison of a second identifier of a second process and the first identifier stored in the register. The comparison is performed in response to the second process causing a change from the second mode to the first mode.

20 Claims, 7 Drawing Sheets

(56) References Cited

U.S. PATENT DOCUMENTS

| | | | |
|---|---|---|---|
| 2006/0242391 A1* | 10/2006 | Elwood | G06F 9/3806 712/238 |
| 2006/0282829 A1* | 12/2006 | McIlvaine | G06F 9/30072 712/E9.05 |
| 2009/0089564 A1* | 4/2009 | Brickell | G06F 9/3844 712/E9.045 |
| 2013/0191824 A1* | 7/2013 | Muff | G06F 9/3806 718/1 |
| 2013/0332712 A1* | 12/2013 | Bonanno | G06F 9/3802 712/238 |
| 2015/0370592 A1* | 12/2015 | Tuch | G06F 9/45558 718/1 |
| 2017/0068538 A1* | 3/2017 | Bonanno | G06F 9/3844 |
| 2019/0018777 A1* | 1/2019 | Swaine | G06F 12/1036 |
| 2019/0166158 A1* | 5/2019 | Grocutt | H04L 63/1416 |
| 2019/0227802 A1* | 7/2019 | Kessler | G06F 9/3848 |
| 2019/0286443 A1* | 9/2019 | Solomatnikov | G06F 9/3848 |
| 2019/0361707 A1* | 11/2019 | Vougioukas | G06F 9/3806 |
| 2020/0372129 A1* | 11/2020 | Gupta | G06F 21/52 |
| 2021/0004234 A1* | 1/2021 | Hu | G06F 9/3844 |

\* cited by examiner

PROTECTION AGAINST BRANCH TARGET BUFFER POISONING BY A MANAGEMENT LAYER

CROSS-REFERENCE TO RELATED APPLICATIONS

The present application is a Continuation application of U.S. patent application Ser. No. 18/224,217, entitled "PROTECTION AGAINST BRANCH TARGET BUFFER POISONING BY A MANAGEMENT LAYER", and filed Jul. 20, 2023, which is a Continuation application of U.S. patent application Ser. No. 16/454,690, entitled "PROTECTION AGAINST BRANCH TARGET BUFFER POISONING BY A MANAGEMENT LAYER", and filed on Jun. 27, 2019, now issued as U.S. Pat. No. 11,797,665, which claims priority to U.S. Provisional Application Ser. No. 62/691,361, entitled "PROTECTION AGAINST BRANCH TARGET BUFFER POISONING BY A MANAGEMENT LAYER", and filed on Jun. 28, 2018, the entirety of which is incorporated by reference herein.

BACKGROUND

Speculative execution of instructions is used to enhance performance of processing systems. For example, a processing unit can predict the outcome of a branch instruction using information in a branch prediction structure. Speculative execution of subsequent instructions along the predicted branch is performed before the processing unit has evaluated the branch instruction. If the predicted branch turns out to be incorrect when the processing unit evaluates the branch instruction, speculative execution along the incorrectly predicted branch is suspended and the state of the processing unit is rolled back to the state at the branch instruction. After the rollback, execution resumes along the correct branch. Examples of branch prediction structures used in branch prediction operations include indirect branch predictors that redirect the flow of the program to an arbitrary instruction indicated in a register referenced by the indirect branch predictor and a branch target buffer (BTB) that includes information for predicting the presence and target addresses of branch instructions. Some implementations of branch prediction structures use a branch history of the results of branch instructions executed by processes that were previously, or are currently, executing on the processing unit as part of the prediction algorithm.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
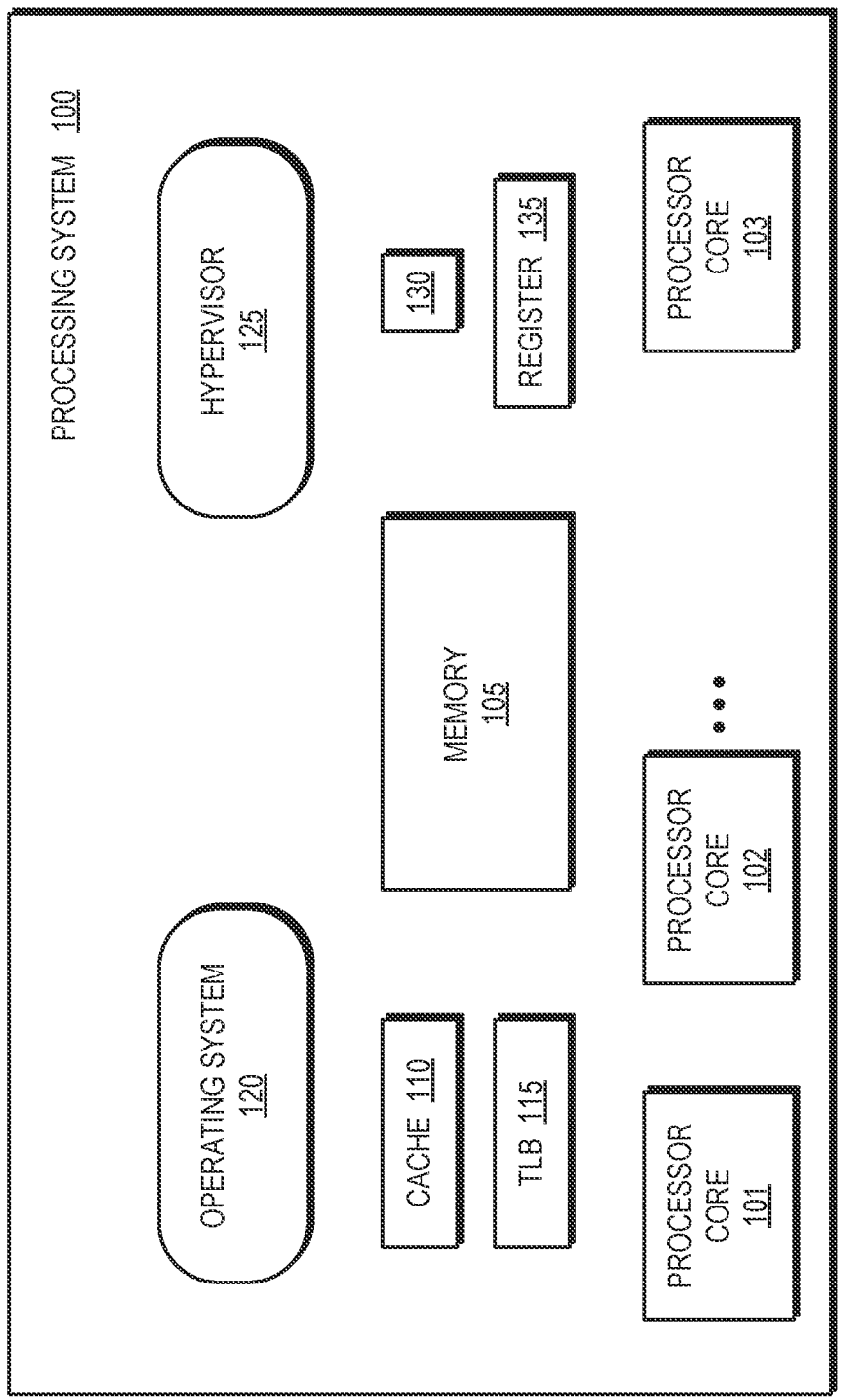
FIG. 1 is a block diagram of a processing system that selectively flushes branch prediction structures to prevent poisoning by a management layer according to some embodiments.

The indirect branch predictors and the BTB are shared resources in some processing systems that include processing units such as central processing units (CPUs), graphics processing units (GPUs), and the like. The shared resources may present a potential security vulnerability and, in certain situations, an unauthorized and/or malicious party could influence the BTB or the indirect target predictor to cause specific, undesired branch predictions that lead to information leakage across privilege domains. In some cases, these influences may be mitigated by using BTB control mechanisms such as:

Indirect Branch Restricted Speculation (IBRS)—This is a mode bit which if set, prevents indirect branches from using BTB predictions. This is intended to be used in privileged code. The IBRS mode prevents indirect branches from using predictions from other contexts.

Indirect Branch Prediction Barrier (IBPB)—This is a command which does a full BTB flush. This command prevents indirect branch predictions after the barrier from being influenced by branch outcomes prior to the IBPB.

Similar commands are used to control operation of indirect target predictors.

In a conventional processing system, a management layer (e.g., a hypervisor (HV) or operating system (OS)) is responsible for sufficiently isolating the BTB (or other predictor) between processes, virtual machines (VMs or guests), and the like. However, an underlying premise in some trusted execution environments is that the HV and the OS should not be trusted because the HV or OS could maliciously change values of registers used to define targets of indirect branch predictors. For example, a guest VM executing on the processing system installs information in a BTB. The guest VM then exits and passes control to the HV, which could maliciously modify the values in the BTB. The guest VM then restarts and begins speculative execution based on the maliciously modified values in the BTB, potentially leading to information leakage from the guest VM to the HV.

The security of a processing system can be improved by performing a BTB flush in response to the processing system entering a trusted mode, e.g., by executing an IBPB to flush the BTB in response to every VMRUN that starts execution of a guest VM. However, indiscriminate flushing of the BTB may negatively impact performance of the processing system because the IBPB operation is considered relatively slow. Furthermore, the management layer is frequently invoked for a short time interval and then a previously running process or guest VM is immediately restarted. Flushing the BTB in response to these transitions (which are referred to herein as "world switches") would destroy information in the BTB that is likely to be valid after the world switch. For example, the VMRUN command is frequently executed to restart a guest VM that populated the BTB prior to handing control to the HV for a short time interval. In that case, flushing the BTB destroys predictions that may still be valid and useful for the guest VM when it restarts after the world switch. Moreover, there are likely to be frequent world switches between the management layer and the process/guest VM. For example, a guest VM exits to the management layer every time the guest VM wants to do emulated memory mapped input/output (MMIO). At least in part because of the impact on the performance of the VM, the amount of time for world switches should be reduced and an IBPB may result in longer times for world switches.

FIGS. 1-7 disclose embodiments of techniques for improving the security of a processing system that performs speculative execution, with reduced impact to the overall performance of the processing system, by storing a first identifier of a first process (such as a guest virtual machine (VM)) in response to the processing system changing from a first mode that allows the first process to modify a branch prediction structure to a second mode in which the branch prediction structure is not modified. The first process modified the branch prediction structure prior to changing from the first mode to the second mode. The first identifier is compared to a second identifier of a second process in response to the processing system changing from the second mode to the first mode and the branch prediction structure is selectively flushed based on the comparison. The branch prediction structure is flushed if the comparison indicates that the first identifier is different than the second identifier. For example, the branch prediction structure is flushed if the second process is an HV that causes a change from the second mode to the first mode and back to the second mode before starting a guest VM. The branch prediction structure is not flushed if the first identifier is the same as the second identifier, which indicates that the first process is the same as the second process.

In some embodiments, the processing system determines whether or not to flush the branch prediction structure in response to performing a world switch from a management layer to a process executing in the processing system. For example, a guest VM is installing entries into a BTB (i.e., the processing system is operating in the first mode) and a world switch is performed from the guest VM to the HV. In response to the world switch, an identifier of the guest VM is stored in a register and the mode is switched to the second mode to disable modification of the BTB by the HV. If another world switch is performed to restart the guest VM and switches modes from the second mode to the first mode, an identifier of the guest VM is compared to the information stored in the register. No flush of the BTB is performed if the comparison indicates a match. However, if the identifier of the guest VM is different than the information stored in the register, e.g., if the HV switches between the first and second modes, the BTB is flushed.

FIG. 1 is a block diagram of a processing system 100 that selectively flushes branch prediction structures to prevent poisoning by a management layer according to some embodiments. The processing system 100 implements one or more processor cores 101, 102, 103, which are collectively referred to herein as "the processor cores 101-103." The processor cores 101-103 execute applications (e.g., as represented by sequences of instructions or operations) that are stored in a memory 105. Some embodiments of the memory 105 are implemented as dynamic random access memory (DRAM). The processor cores 101-103 access the instructions using physical addresses, virtual addresses, or addresses of cache lines in embodiments that implement caching of instructions in a cache 110 or other portions of a cache hierarchy such as caches implemented in the processor cores 101-103. The processing system 100 also includes a translation lookaside buffer (TLB) 115 that stores frequently used mappings of virtual addresses to physical addresses. Results of the instructions executed by the processor cores 101-103 are stored in the memory 105. The processor cores 101-103 execute instructions sequentially, concurrently, or in parallel with each other.

The privilege level of a process executing on one of the processor cores 101-103, the guest/hypervisor status of the process and other context state are known and controlled by a management layer including an operating system (OS) 120 for the processing system 100 or a hypervisor 125 of one or more VMs that are executing in the processing system 100. Some embodiments of the processing system 100 include one or more bits 130 that are set to different values to indicate different operating modes of the processing system 100 or the processor cores 101-103. For example, a first value of the bit 130 indicates a first mode in which branch prediction structures (not shown in FIG. 1 in the interest of clarity) are modifiable by the process that is currently executing on the processing system 100 or the processor cores 101-103. A second value of the bit 130 indicates a second mode in which the branch prediction structures are not modifiable by the currently executing process. Depending on the circumstances, the executing process is a management layer process (such as the OS 120 or the HV 125) or a lower privilege level process such as a guest VM.

The processing system 100 also includes one or more registers 135 that store values that identify processes that were previously allowed to modify the branch prediction structures. In response to world switches and changes between the modes indicated by the bit 130, the values in the registers 135 are compared with an identifier of a currently executing process, e.g., a management layer or guest VM. The branch prediction structure is maintained intact and flushing of the branch prediction structure is bypassed if the comparison indicates that the identifier of the currently executing process matches the value in the register 135. The branch prediction structure is flushed in response to a mismatch between identifier of the currently executing process and the value in the register 135.

Figure 2:
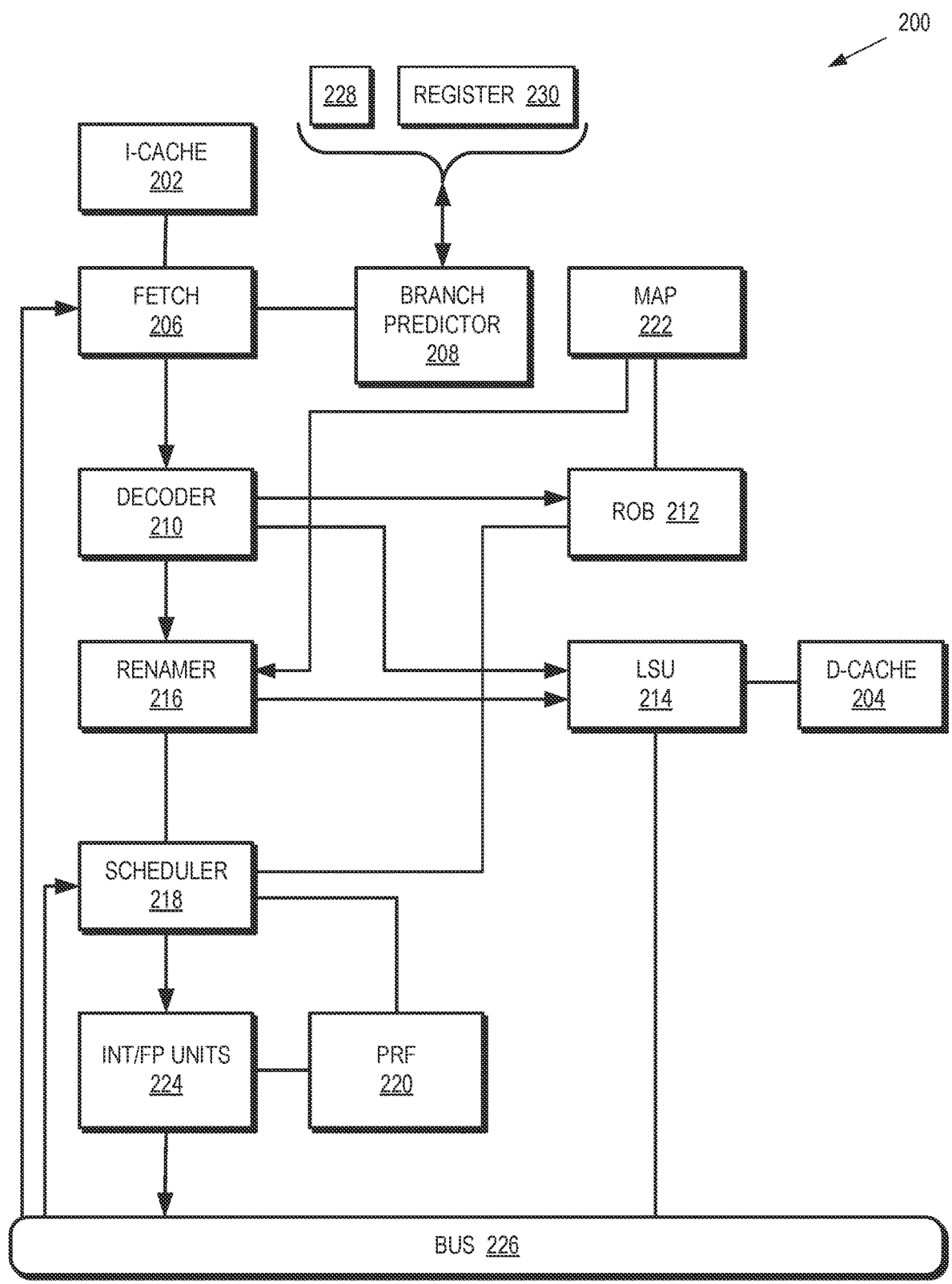
FIG. 2 is a block diagram of a processor core according to some embodiments.

FIG. 2 is a block diagram of a processor core 200 according to some embodiments. The processor core 200 is used to implement some embodiments of the processor cores 101-103 shown in FIG. 1. Some embodiments of the processor core 200 include circuitry for executing instructions according to a predefined instruction set and are implemented in a single-processor configuration or in a multi-processor configuration.

The processor core 200 includes an instruction cache (I-cache) 202 to store instructions for a software application and a data cache (D-cache) 204 to store data used in computations performed by the instructions. In some instances, the I-cache 202 and the D-cache 204 are implemented together as a unified cache or as part of a hierarchy of caches such as L1 and L2 cache structures. The processor core 200 further includes an instruction fetch unit 206 for fetching one or more instructions from the I-cache 202. The fetch unit 206 may include a program counter (PC) register that holds a pointer to an address of the next instruction to fetch from the I-cache 202.

A branch prediction unit 208 is coupled to the fetch unit 206 and predicts results of instructions that change the flow of an instruction stream from executing a next sequential instruction, e.g., branch instructions. Examples of branch prediction units 208 include indirect branch predictors that redirect the flow of the program to an arbitrary instruction indicated in a register referenced by the indirect branch predictor and a branch target buffer (BTB) that includes information for predicting the presence and target addresses of branch instructions. A branch instruction is conditionally executed depending on how the flow of control is altered at the branch point. For example, an IF(A)-THEN(B)-ELSE (C) statement is a branch instruction that directs the program flow down the path represented by branch B if the condition A is satisfied. Otherwise, this instruction directs the program flow down the path represented by branch C. The branch prediction unit 208 predicts whether the condition A is satisfied before the instruction is executed to evaluate the condition A. Instructions down the path represented by branch B are speculatively dispatched and executed if the branch prediction unit 208 predicts that the condition A is satisfied. Instructions down the path represented by branch C are speculatively dispatched and executed if the branch prediction unit 208 predicts that the condition A is not satisfied. Some embodiments of the branch prediction unit 208 include a branch target buffer (BTB) or indirect target predictor.

A decoder 210 implemented in the processor core 200 decodes the opcodes of the fetched instructions. Some embodiments of the decoder 210 divide a single instruction into two or more micro-operations (micro-ops). The micro-ops are processed by subsequent pipeline stages and executed in program order or out-of-order. However, the micro-ops are not committed until each micro-op corresponding to an original instruction is ready. As used herein, a reference to the processing of an "instruction" in the processor core 200 refers to the processing of the instruction as whole or to the processing of an individual micro-op within the instruction. The decoder 210 allocates entries in a reorder buffer (ROB) 212, which may also be referred to as an in-order retire queue or retirement unit. Some embodiments of the decoder 210 also allocates entries in reservation stations, in a load/store unit (LSU) 214, or in other locations. In the example shown, a reservation station includes a renamer 216 and a scheduler 218, which are shown as separate units. The flow of instructions from the decoder 210 to the allocation of entries in the renamer 216 is referred to as the dispatch of instructions.

The renamer 216 performs register renaming for the fetched instructions, e.g., mapping or "renaming" the architectural registers used by the instructions into tags that refer to physical registers in a physical register file (PRF) 220. An architectural state map (MAP) 222 stores the mapping of the logical or architectural register numbers to the associated physical register numbers that indicate the physical registers in the physical register file 220. A new physical register is allocated from the physical register file 220 in response to each write to a logical architectural register. The architectural state map 222 therefore stores a snapshot of the mappings in the processor core 200 at a given point in the program. In some embodiments, the architectural state map 222 includes multiple maps or checkpoints such as a dispatch map, a retire map, and one or more checkpoints that are used to roll back the state of the processor core 200, e.g., in response to a branch misprediction. The dispatch map tracks the current mappings at dispatch time and is used to "rename" the logical/architectural register identifier to the physical register entry. The retire map stores the mapping associated with retired state. Some embodiments of the architectural state map 222 are therefore distributed across different locations within the processor core 200.

The state of the processor core 200 is indicated by values stored in general-purpose registers in the physical register file 220. For example, the state of the processor core 200 may be represented by the architectural state map 222 and the contents of the physical register file 220. Some embodiments of the architectural state map 222 include representations of the committed state of the processor core 200 and the speculative state of the processor core 200, e.g., they include general purpose registers that store values that represent the committed or speculative states of the processor core 200.

Once decoded and renamed, instructions are ready to be scheduled for execution. The scheduler 218 acts as an instruction queue where instructions are stored in entries and wait until their operands become available in the corresponding source registers. When operands are available and hardware resources are also available, an instruction is issued from the scheduler 218 to the integer and floating-point functional units 224 or the load/store unit 214 for execution. Some embodiments of the functional units 224 include arithmetic logic units (ALUs) for computational calculations such as addition, subtraction, multiplication, division, and square root. For example, mathematical operations such as addition, subtraction, multiplication, division, transcendental operations, and the like are dispatched to the integer/floating-point functional units 224. Load operations that load a value from a memory into a physical register and the physical register file and store operations that store a value from a physical register to a location in the memory are dispatched to the load/store unit 214. Upon completion of an instruction, the scheduler 218 signals completion and a fault status for the instruction to the ROB 212.

In the event of a fault, the ROB 212 provides fault signals to the scheduler 218 to identify and clear speculative instructions along incorrectly predicted paths. Some embodiments of the scheduler 218 include compare logic to compare retire queue identifiers of incorrect speculative instructions to identifiers of entries in the scheduler 218 for clearing incorrect speculative instructions. Flush recovery updates are also sent from the ROB 212 to the renamer 216, e.g., when the ROB 212 frees one or more entries in the physical register file 220 for use by the renamer 216. In some embodiments, a rename bus between the ROB 212 and the renamer 216 may include four ports that can each write entries in the renamer 216, e.g. to support flush recovery for four instructions in parallel. The architectural state map 222 is copied to the renamer 216 for flush recovery when retirement of instructions in the ROB 212 has caught up to the flush.

Results from the functional units 224 or the load/store unit 214 are presented on a common data bus 226. In some embodiments, the results are written to the PRF 220 from the INT/FP units 224 in response to the instruction completing execution. The results can also be forwarded to any dependent operations that use the results. The results are also sent to the ROB 212 where the instruction receives its results and is marked for retirement. Instructions in the ROB 212 are retired in-order and a head-of-queue pointer is adjusted to the subsequent instruction in program order as each instruction is retired.

The processor core 200 is protected from poisoning of the branch prediction unit 208 by management layer processes by selectively flushing the branch predictor 208. The processor core 200 includes one or more bits 228 to indicate an operating mode of the processor core 200 and one or more registers 230 that store values indicating whether the management layer or another process previously caused the processor core 200 to change from a first mode to a second mode. In the first mode, the branch predictor 208 is modifiable by the management layer or process and, in the second mode, the branch prediction structure is not modifiable by the management layer or process. In some embodiments, a first identifier of a first process is stored in the register 230 in response to the processor core 200 changing from the first mode to the second mode. The branch predictor 208 is then selectively flushed in response to the mode change based on a comparison of a second identifier of a second process and the first identifier stored in the register 230. The mode change is detected by monitoring the bits 228, e.g., a first value of the bits 228 indicates the first mode and a second value of the bits 228 indicates the second mode. The bits 228 or the registers 230 are implemented external to the processor core 200 in some embodiments and internal to the processor core 200 in other embodiments. For example, the bits 228 or the registers 230 can be implemented using registers in the PRF 220.

Figure 3:
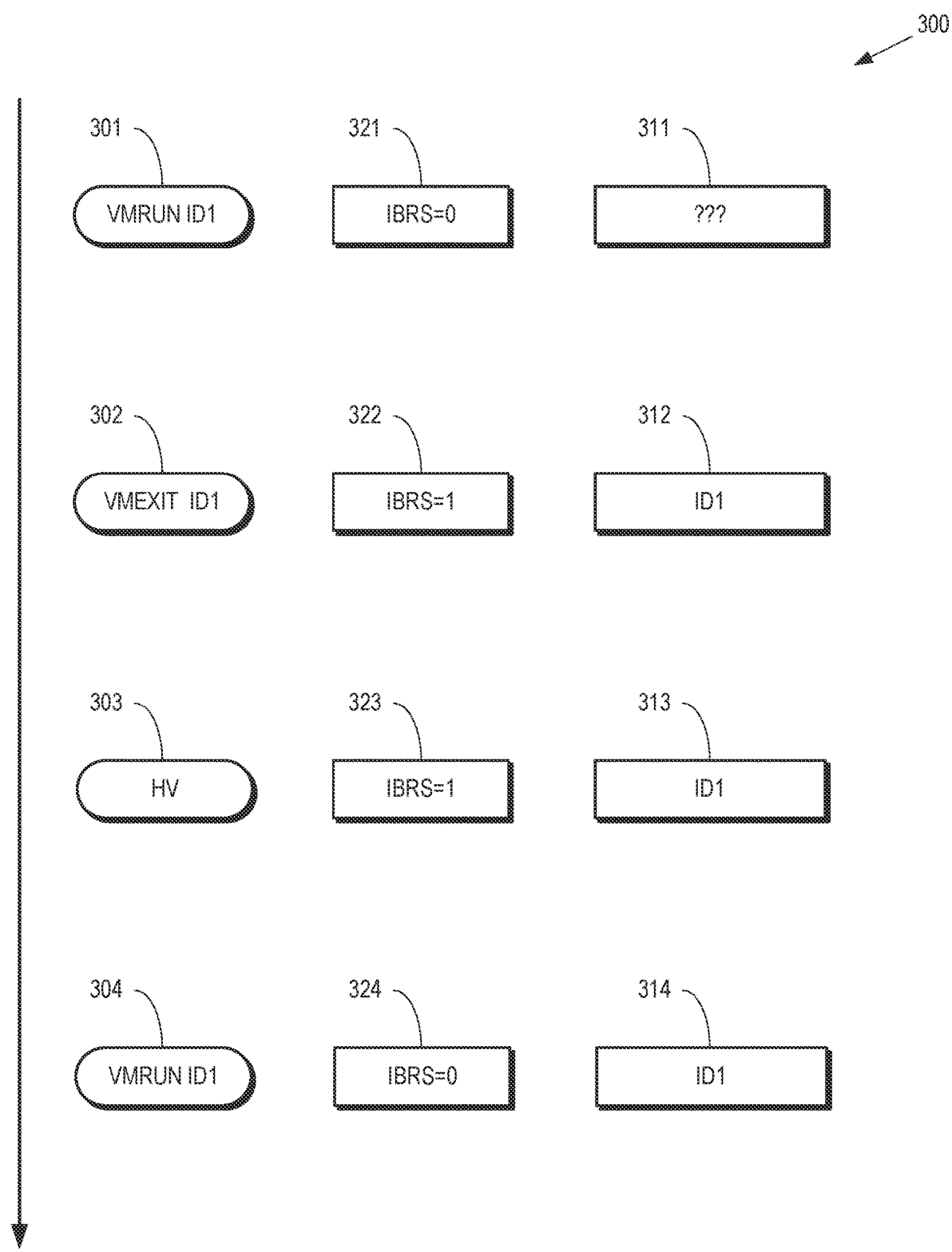
FIG. 3 illustrates a sequence of events including world switches in a processing system according to some embodiments.

FIG. 3 illustrates a sequence 300 of events including world switches in a processing system according to some embodiments. The sequence 300 occurs in some embodiments of the processing system 100 shown in FIG. 1 and the processor core 200 shown in FIG. 2. The sequence 300 includes the events 301, 302, 303, 304 (collectively referred to herein as "the events 301-304") that occur at successive time intervals indicated by the arrow pointing from top to bottom of FIG. 3.

The sequence 300 illustrates values 311, 312, 313, 314 of a register such as some embodiments of the register 135 shown in FIG. 1 and the register 230 shown in FIG. 2, which are collectively referred to herein as "the register values 311-314." As discussed herein, the register values 311-314 are used to keep track of the process that was previously (and most recently) able to modify a branch prediction structure in the processing system. Comparing the register values 311-314 to a value of an identifier of a currently executing process, such as a guest VM, is used to determine whether the guest VM was the last process that modified the branch prediction structure or whether an intervening management layer was able to modify the branch prediction structure, e.g., during a world switch from the guest VM to an HV and back to the guest VM.

The sequence 300 also illustrates corresponding values 321, 322, 323, 324 of a bit such as some embodiments of the bit 130 shown in FIG. 1 and the bit 228 shown in FIG. 2, which are collectively referred to herein as "the bit values 321-324." The bit values 321-324 indicate first and second modes of operation of the processing system. For example, a value of IBRS=0 indicates that a process executing on the processing system is allowed to modify the branch prediction structure and a value of IBRS=1 indicates that the process executing on the processing system is not allowed to modify the branch prediction structure.

The first event 301 starts a guest VM executing on the processing system using a VMRUN command to initiate the guest VM with the identifier ID1. In response to the first event 301, the bit value 321 is set to IBRS=0 to allow the guest VM to modify the branch prediction structure, which may or may not have been flushed prior to the first event 301, as indicated by the "???" in the register 311.

At the second event 302, the guest VM stops executing on the processing system in response to a VMEXIT command that references the identifier ID1. The bit value 322 is set to IBRS=1 so that processes are not allowed to modify the branch prediction structure. The identifier ID1 of the guest VM is stored as the register value 312 in response to the operating mode of the processing system changing from the first mode (IBRS=0) to the second mode (IBRS=1).

Following the world switch from the guest VM to the HV triggered by VMEXIT, the HV assumes control at the third event 303. In the illustrated embodiment, the HV operates normally and does not cause any changes in the operating mode of the processing system. The bit value 323 therefore remains IBRS=1 to indicate that the processing system is in the second mode. The register value 313 remains equal to the identifier ID1 to indicate that the guest VM is the last process that was able to modify the branch prediction structure.

The fourth event 304 is a VMRUN command that causes a world switch from the HV to the guest VM. In response to the fourth event 304, the bit value 324 is set to IBRS=0 to allow the guest VM to modify the branch prediction structure. The change from the second mode to the first mode caused by the fourth event 304 triggers a comparison of the identifier of the guest VM to the register value 314. In the illustrated embodiment, the identifier of the guest VM matches the register value 314 because both values are equal to the identifier ID1. The matching identifiers indicate that the guest VM was the last process that was able to modify the branch prediction structure. Flushing of the branch prediction structure is therefore bypassed to allow the guest VM to utilize the previously installed values of the branch prediction structure.

Figure 4:
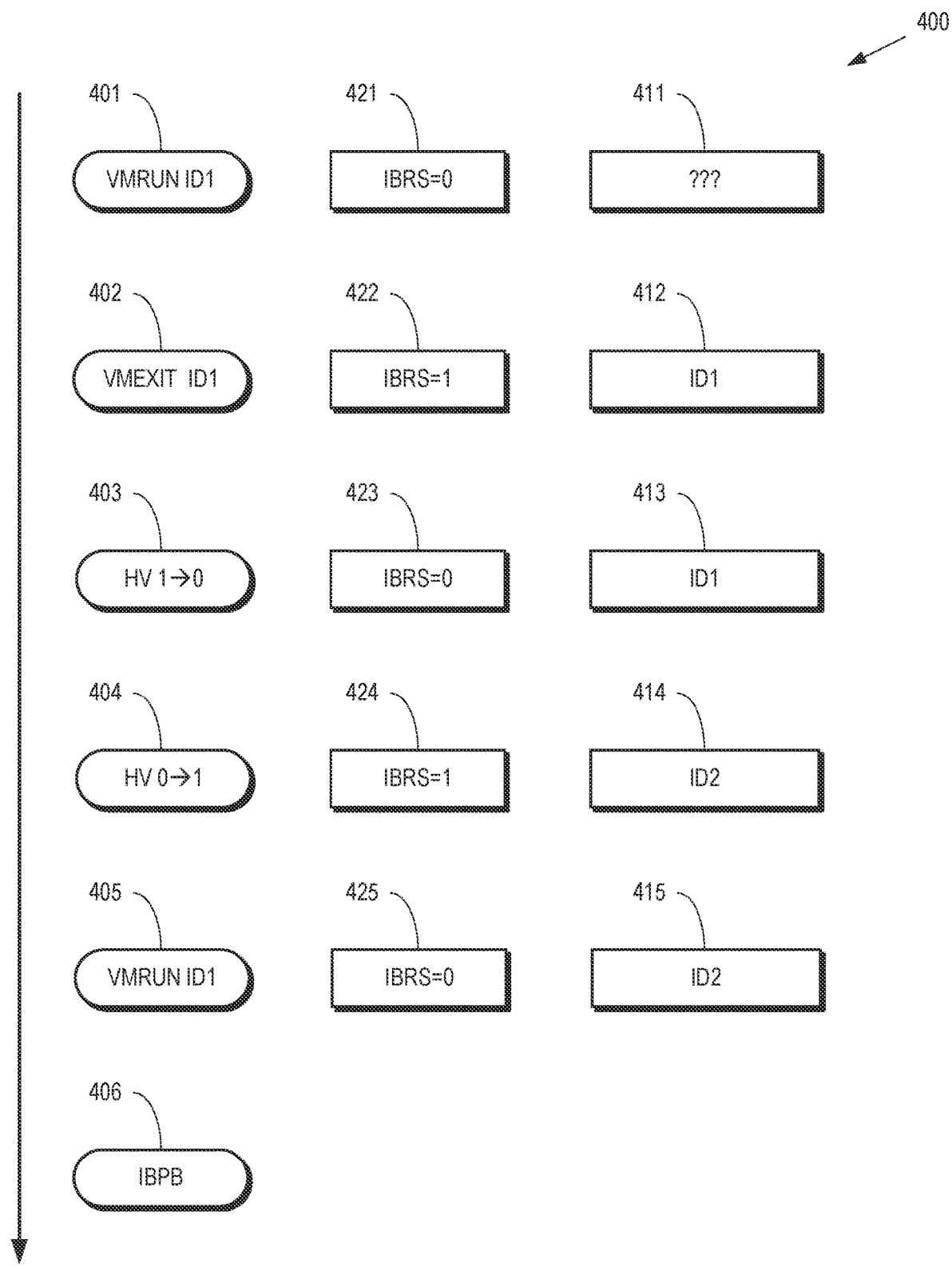
FIG. 4 illustrates a sequence of events including a potentially malicious mode change during world switches in a processing system according to some embodiments.

FIG. 4 illustrates a sequence 400 of events including a potentially malicious mode change during world switches in a processing system according to some embodiments. The sequence 400 occurs in some embodiments of the processing system 100 shown in FIG. 1 and the processor core 200 shown in FIG. 2. The sequence 400 includes the events 401, 402, 403, 404, 405, 406 (collectively referred to herein as "the events 401-406") that occur at successive time intervals indicated by the arrow pointing from top to bottom of FIG. 4. The sequence 400 illustrates values 411, 412, 413, 414, 415 of a register such as some embodiments of the register 135 shown in FIG. 1 and the register 230 shown in FIG. 2, which are collectively referred to herein as "the register values 411-415." The sequence 400 also illustrates corresponding values 421, 422, 423, 424, 425 of a bit such as some embodiments of the bit 130 shown in FIG. 1 and the bit 228 shown in FIG. 2, which are collectively referred to herein as "the bit values 421-425."

The first event 401 starts a guest VM executing on the processing system using a VMRUN command to initiate the guest VM with the identifier ID1. In response to the first event 401, the bit value 421 is set to IBRS=0 to allow the guest VM to modify the branch prediction structure, which may or may not have been flushed prior to the first event 401, as indicated by the "???" in the register 411.

The guest VM stops executing on the processing system (at the second event 402) in response to a VMEXIT command that references the identifier ID1. The bit value 422 is set to IBRS=1 so that processes are not allowed to modify the branch prediction structure. The identifier ID1 of the guest VM is stored as the register value 412 in response to the operating mode of the processing system changing from the first mode (IBRS=0) to the second mode (IBRS=1).

Following the world switch from the guest VM to the HV triggered by the VMEXIT, the HV assumes control at the third event 403. In the illustrated embodiment, the HV changes the operating mode of the processing system from the second mode (IBRS=1) to the first mode (IBRS=0) at the time of the world switch triggered by the VMEXIT or at any subsequent time prior to the next VMRUN, which allows the HV to modify (perhaps maliciously) the contents of the branch prediction structure. The HV is not a trusted entity and therefore the security of the processing system may be compromised by the ability of the HV to modify the contents of the branch prediction structure. At this point, the register value 413 includes the identifier ID1.

At the fourth event 404, the HV changes the operating mode of the processing system from the first mode (IBRS=0) to the second mode (IBRS=1). The identifier ID2 of the HV is stored as the register value 414 in response to the operating mode of the processing system changing from the first mode (IBRS=0) to the second mode (IBRS=1).

The fifth event 405 is a VMRUN command that causes a world switch from the HV to the guest VM. In response to the fifth event 405, the bit value 424 is set to IBRS=0 in association with the world switch to allow the guest VM to modify the branch prediction structure. The change from the second mode to the first mode caused by the fifth event 405 triggers a comparison of the identifier of the guest VM to the register value 414. In the illustrated embodiment, the identifier ID1 of the guest VM is different than the register value 414 representing the identifier ID2 of the HV. The mismatched identifiers indicate that the guest VM was not the last process that was able to modify the branch prediction structure and the HV could have (perhaps maliciously) modified the branch prediction structure. The branch prediction structure is therefore flushed (using an IBPB command at event 406) to protect the guest VM from any possible poisoning of the branch prediction structure by the HV.

Figure 5:
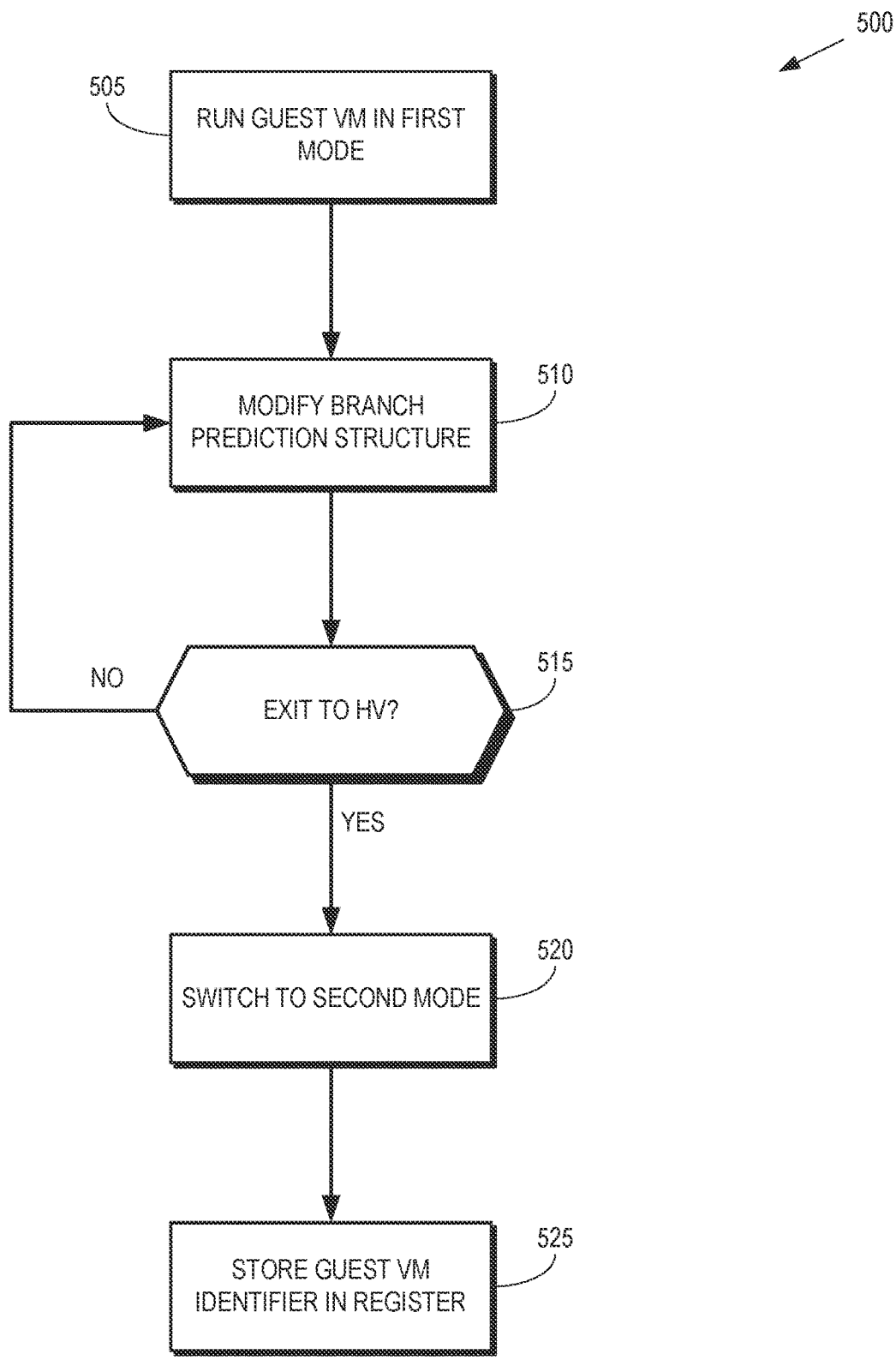
FIG. 5 is a flow diagram of a method of storing process identifiers in a register to determine which processes were able to modify a branch prediction structure according to some embodiments.

FIG. 5 is a flow diagram of a method 500 of storing process identifiers in a register to determine which processes were able to modify a branch prediction structure according to some embodiments. The method 500 is implemented in some embodiments of the processing system 100 shown in FIG. 1 and the processor core 200 shown in FIG. 2.

At block 505, a process such as a guest VM is run on a processing system. In some embodiments, the guest VM is run by executing a VMRUN command. The processing system is operating in a first mode that allows the guest VM to modify a branch prediction structure.

At block 510, the guest VM modifies the branch prediction structure. For example, the guest VM can install entries in the branch prediction structure that are used to predict the outcomes of conditional instructions executed by the guest VM.

At decision block 515, the processing system determines whether a world switch has occurred. In response to a world switch, the guest VM exits and an HV begins executing on the processing system. If a world switch occurred, the method 500 flows to block 520. If no world switch occurred, the method 500 flows to block 510.

At block 520, the operating mode of the processing system changes from the first mode to a second mode in which the branch prediction structure is not modifiable. As discussed herein, the HV is not a trusted entity in the processing system and switching the operating mode of the processing system from the first mode to the second mode is intended to maintain security of the processing system by preventing the HV from modifying the branch prediction structure.

At block 525, an identifier of the guest VM is stored in the register. In the event that the guest VM is re-initiated and begins executing on the processing system following operations performed by the HV, the value in the register is used to determine whether the guest VM was the last entity that was permitted to modify the branch prediction structure or if the HV was able to gain access to the branch prediction structure.

Figure 6:
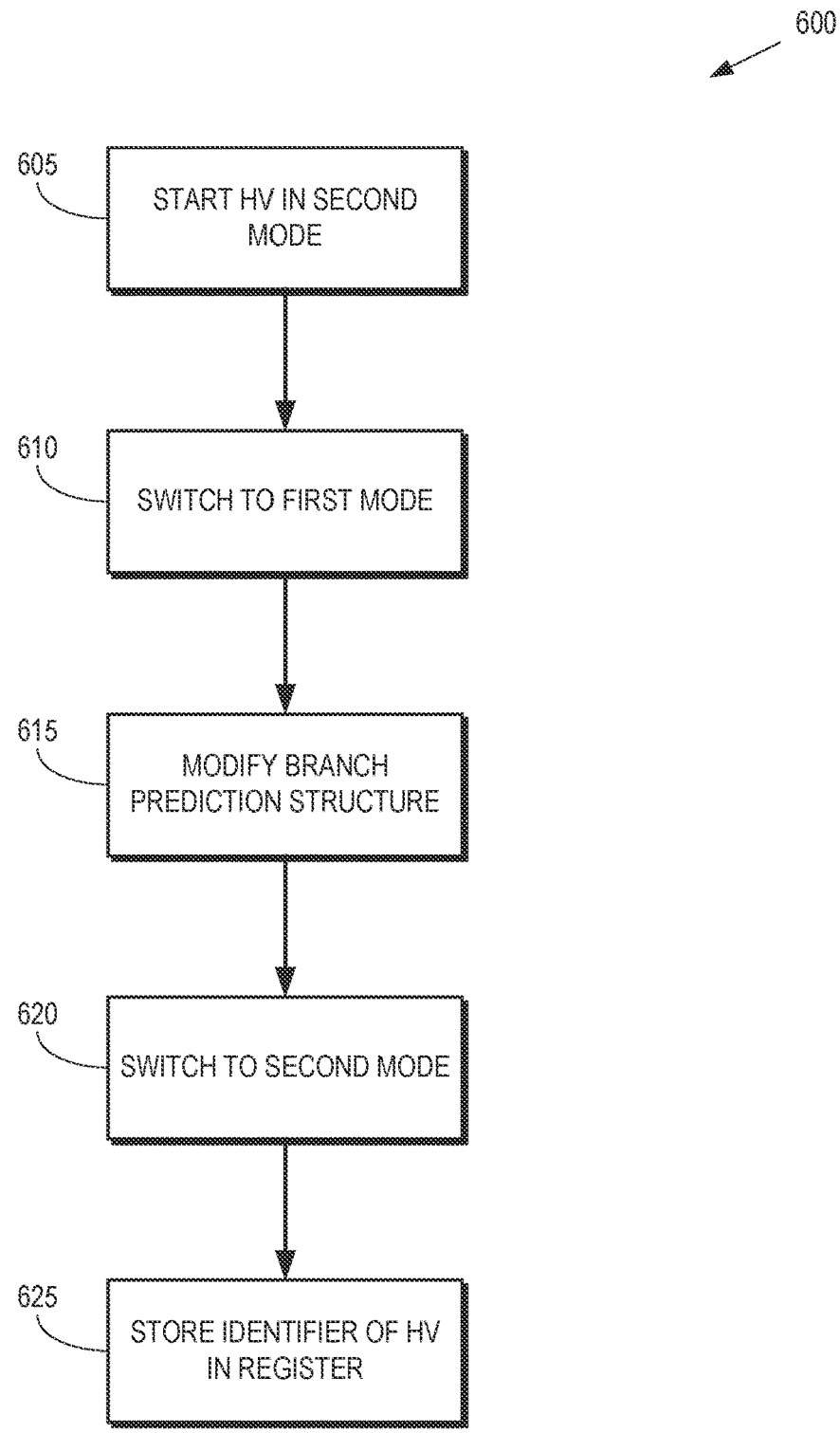
FIG. 6 is a flow diagram of a method of storing an identifier of a hypervisor in a register to indicate that the hypervisor was able to modify a branch prediction structure according to some embodiments.

FIG. 6 is a flow diagram of a method 600 of storing an identifier of an HV in a register to indicate that the HV was able to modify a branch prediction structure according to some embodiments. The method 600 is implemented in some embodiments of the processing system 100 shown in FIG. 1 and the processor core 200 shown in FIG. 2.

At block 605, an HV begins executing on a processing system. In some embodiments, the HV begins executing in response to a world switch that occurs after a guest VM exits. Prior to the world switch, the processing system was executing in a first mode that allows the guest VM to modify a branch prediction structure. Following the world switch, the processing system is operating in a second mode in which the branch prediction structure is not modifiable. Changing the operating mode of the processing system to the second mode is intended to prevent untrusted entities, such as the HV, from modifying the branch prediction structure.

At block 610, the HV changes the operating mode of the processing system to the first mode, which permits the HV to make changes to the branch prediction structure. At block 615, the HV modifies the branch prediction structure. In some embodiments, the HV maliciously modifies the branch prediction structure to cause a subsequently executing guest VM to perform operations that results in leaking information to untrusted entities.

At block 620, the HV changes the operating mode of the processing system from the first mode to the second mode. In response to the change in the operating mode from the first mode to the second mode, an identifier of the HV is stored (at block 625) in a register.

Figure 7:
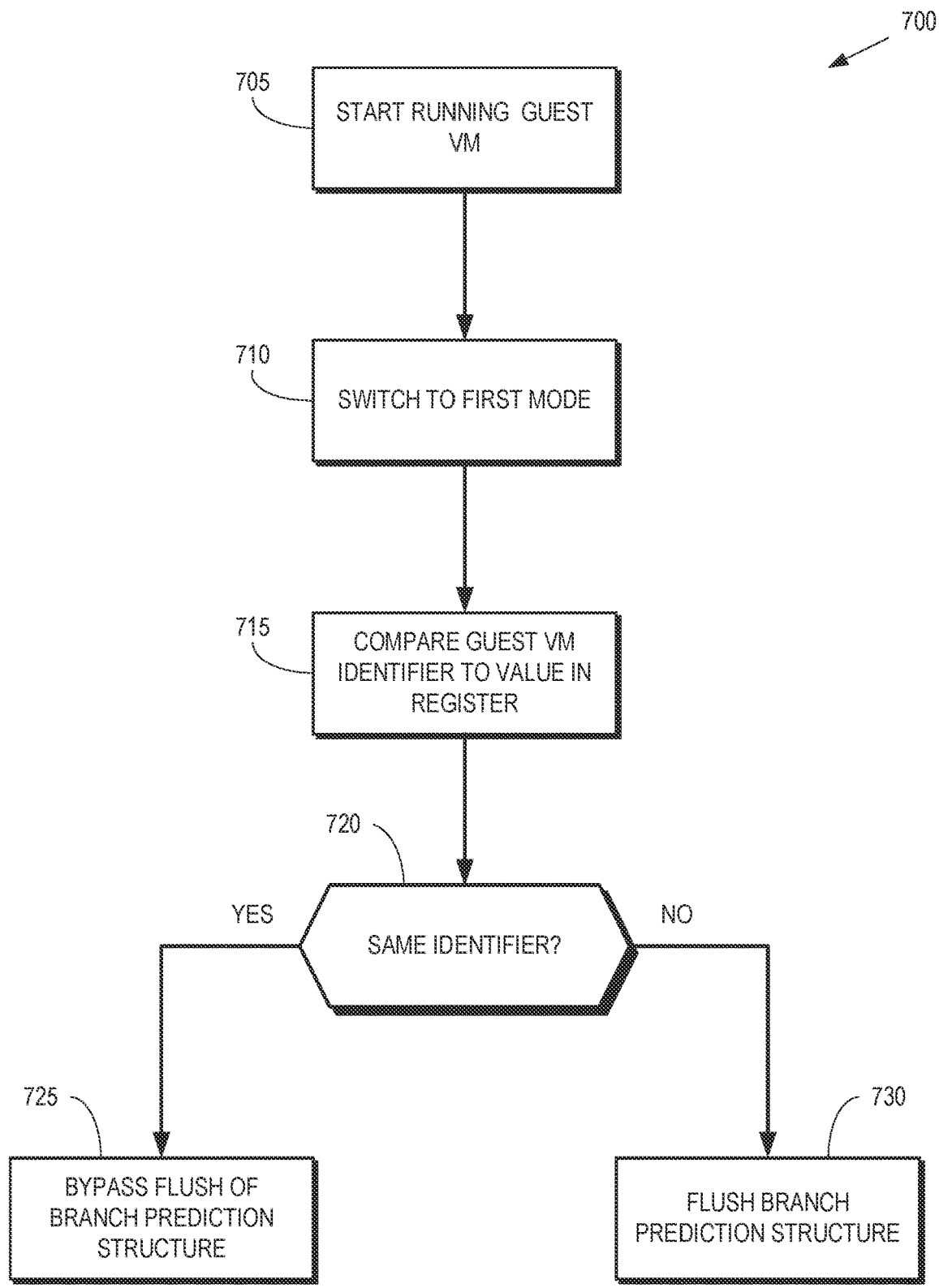
FIG. 7 is a flow diagram of a method of selectively flushing a branch prediction structure based on values of identifiers stored in a register according to some embodiments.

FIG. 7 is a flow diagram of a method 700 of selectively flushing a branch prediction structure based on values of identifiers stored in a register according to some embodiments. The method 700 is implemented in some embodiments of the processing system 100 shown in FIG. 1 and the processor core 200 shown in FIG. 2.

At block 705, a process such as a guest VM resumes execution on a processing system. In some embodiments, the guest VM is run by executing a VMRUN command. The processing system is operating in a second mode in which the branch prediction structure is not modifiable. At block 710, the processing system switches to a first mode that allows the guest VM to modify the branch prediction structure. The change from the second mode to the first mode occurs in association with execution of the VMRUN command. In some embodiments, the switch from the second mode to the first mode occurs on execution of the VMRUN command. In other embodiments, the guest VM begins execution following the VMRUN command in the second mode and the guest VM subsequently changes the operating mode from the second mode to the first mode.

In response to changing modes from the second mode to the first mode, the processing system compares (at block 715) an identifier of the guest VM to a value of an identifier stored in a register in the processing system, such as the register 135 shown in FIG. 1 and the register 230 shown in FIG. 2. The processing system then determines (at decision block 720) whether the guest VM identifier is the same as the identifier stored in the register. If so, the method 700 flows to block 725. If the two identifiers are different, the method 700 flows to the block 730.

At block 725, the processing system bypasses flushing the branch prediction structure. The information in the branch prediction structure is therefore retained and available for use by the guest VM.

At block 730, the processing system flushes the branch prediction structure because the difference between the identifier of the guest VM and the stored identifier indicates that the HV could have (perhaps maliciously) modified the branch prediction structure. Modifications of the branch prediction structure could cause information leakage to untrusted entities in the processing system. Flushing the branch prediction structure prevents this information leakage at the cost of losing any previously established branch prediction information for the guest VM.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    triggering, by a first process executing on a processing system, a mode change for a branch prediction structure from a first mode to a second mode, wherein the branch prediction structure is modifiable in the first mode and not modifiable in the second mode;
    executing a second process on the processing system after executing the first process; and
    flushing the branch prediction structure based on the second process being different from the first process.

2. The method of claim 1, wherein the first process is a management layer process.

3. The method of claim 1, further comprising, prior to triggering the mode change by the first process executing on the processing system:
    executing the second process on the processing system in the first mode; and
    in response to stopping execution of the second process on the processing system and switching from the first mode to the second mode, storing a second process identifier associated with the second process.

4. The method of claim 3, further comprising:
    after stopping execution of the second process, executing the first process on the processing system in the first mode; and
    in response to the first process triggering the mode change from the first mode to the second mode, storing a first process identifier associated with the first process.

5. The method of claim 4, further comprising:
    transitioning from executing the first process on the processing system to executing the second process on the processing system.

6. The method of claim 5, further comprising:
    performing a comparison of the first process identifier with an identifier associated with the second process, wherein a mismatch in the comparison indicates that the second process executing on the processing system is different from the first process.

7. The method of claim 1, wherein the first process is a hypervisor and the second process is a virtual machine.

8. A method comprising:
    triggering, by a first process executing on a processing system, a mode change for a branch prediction structure from a first mode to a second mode, wherein the branch prediction structure is modifiable in the first mode and not modifiable in the second mode; and
    bypassing flushing the branch prediction structure during a subsequent execution of the first process based on the first process being a last process to execute on the processing system in the first mode.

9. The method of claim 8, wherein the first process is a virtual machine.

10. The method of claim 8, further comprising:
in response to triggering the mode change, storing a first identifier associated with the first process.

11. The method of claim 10, further comprising:
after storing the first identifier and prior to the subsequent execution of the first process on the processing system, executing a second process on the processing system in the second mode.

12. The method of claim 11, further comprising:
switching from executing the second process on the processing system to executing the first process on the processing system during the subsequent execution.

13. The method of claim 12, wherein bypassing flushing the branch prediction structure during the subsequent execution of the first process on the processing system comprises:
performing a comparison of the stored first identifier with an identifier associated with the first process.

14. The method of claim 13, wherein bypassing flushing the branch prediction structure is based on a match in the comparison.

15. The method of claim 11, wherein the first process is a virtual machine, and the second process is a hypervisor.

16. A processing system comprising:
a branch prediction structure configured to store information used to predict an outcome of a branch instruction; and
a processor core configured to:
trigger, while executing a first process on the processing system, a mode change from a first mode that allows for modification of the branch prediction structure to a second mode, wherein the branch prediction structure is not modifiable in the second mode;
after triggering the mode change while executing the first process on the processing system, stop executing the first process and execute a second process on the processing system; and
selectively flush the branch prediction structure during a subsequent execution of the first process on the processing system based on the second process executing on the processing system in the first mode.

17. The processing system of claim 16, wherein the second process is a management layer process.

18. The processing system of claim 16, the processor core configured to:
bypass flushing the branch prediction structure during the subsequent execution of the first process on the processing system based on the second process not executing on the processing system in the first mode.

19. The processing system of claim 16, further comprising:
a register configured to store identifiers associated with the first process or the second process; and
at least one bit configured to store a first value that indicates the processing system is in the first mode and a second value that indicates that the processing system is in the second mode.

20. The processing system of claim 16, wherein the first process is a virtual machine, and the second process is a hypervisor.

* * * * *